Figure 4:
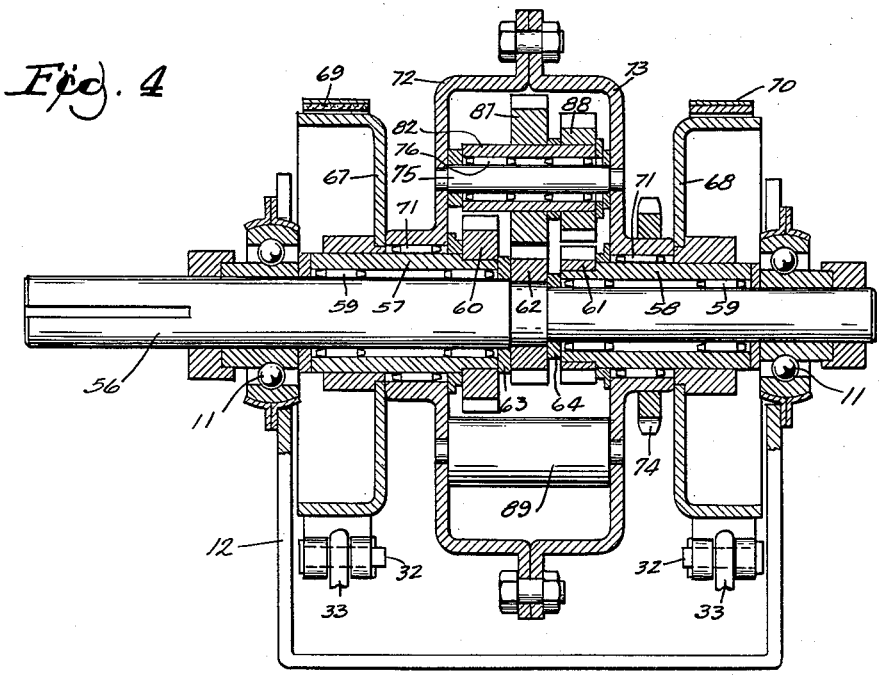

Nov. 5, 1963 M. O. HOLTAN 3,109,325
PLANETARY SPEED CHANGE TRANSMISSION
Filed Dec. 21, 1961 3 Sheets-Sheet 1
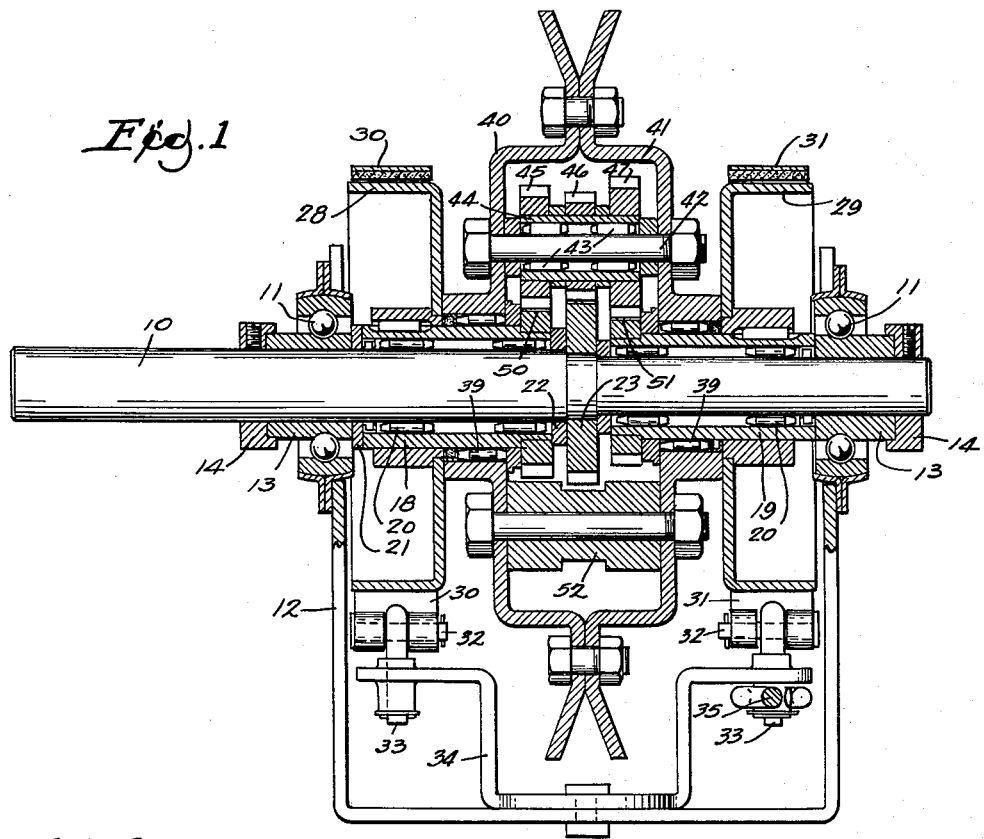
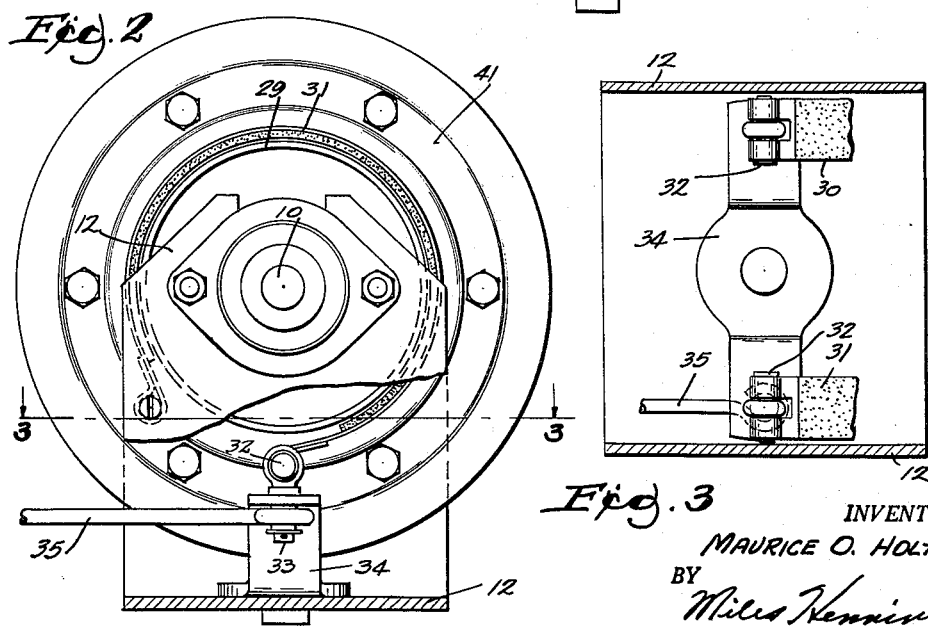
INVENTOR.
MAURICE O. HOLTAN
BY
*Miles Henninger*
ATTORNEY Nov. 5, 1963          M. O. HOLTAN          3,109,325

PLANETARY SPEED CHANGE TRANSMISSION

Filed Dec. 21, 1961          3 Sheets-Sheet 2

INVENTOR.
MAURICE O. HOLTAN
BY
ATTORNEY

United States Patent Office 3,109,325
Patented Nov. 5, 1963

3,109,325
PLANETARY SPEED CHANGE TRANSMISSION
Maurice O. Holtan, 2012 Menomonee River Parkway,
Wauwatosa, Wis.
Filed Dec. 21, 1961, Ser. No. 161,128
4 Claims. (Cl. 74—767)

This invention relates to improvements in power transmissions of a simplified construction somewhat resembling planetary gearing, in which the housing is also the planet carrier and either one of two gears may act as a reaction gear dependent on the direction of power output desired.

In one modification, the present power transmissions are made with a minimum of gearing including a single planet shaft and pinion assembly which is counter-balanced by a weight diametrically across the planet carrier from the planet assembly. Such single planet assembly includes two gears severally engaged with gears alternately acting as reaction gears and one gear meshing with the sun gear of the transmission. Control of reaction gear rotation determines the direction of power output and the control may be by way of drum-band or other clutching means selectively controlling movement of the reaction gears. Thus the single planet assembly structure shown can produce either one reverse and one forward speed or two speeds in either reverse or forward directions. In spite of the greatly simplified construction of the first embodiment of the transmission, there is no appreciable vibration under any conditions of use.

The second embodiment of the invention allows the obtaining of much wider ranges of both the higher forward speed and the lower reverse speed than in the first construction. In the second construction the gears always rotate freely and there is no sliding of gear teeth on one another as is true in the first structure. However, the second structure differs from a true planetary gear by the addition of a gear on each of two of the planet assemblies to secure reversing, which gears are not present in a true planetary system. In the second construction the planet assemblies include a gear individually coacting with a sun gear on the input shaft and two gears meshing individually with one of two reaction gears which may be allowed to rotate freely or may be held stationary by drum-band structures acting as a clutch for the different reaction gears. Thus the different combinations of planet gears are effective at different times to produce either two forward speeds or one forward and one reverse speed, with a smooth and quiet flow of power.

Modification of the second embodiment by the addition thereto of a clutch connecting the power input shaft with one drum-band structure, allows one reaction gear to be controlled either by such drum-band or such clutch so that the reaction gear may be either held stationary or may be revolved at the input speed. It is then possible to obtain three speeds by way of different combinations of gear trains, the speeds being preferably a high or direct forward speed, a lower forward speed and a reverse speed.

Figure 5:
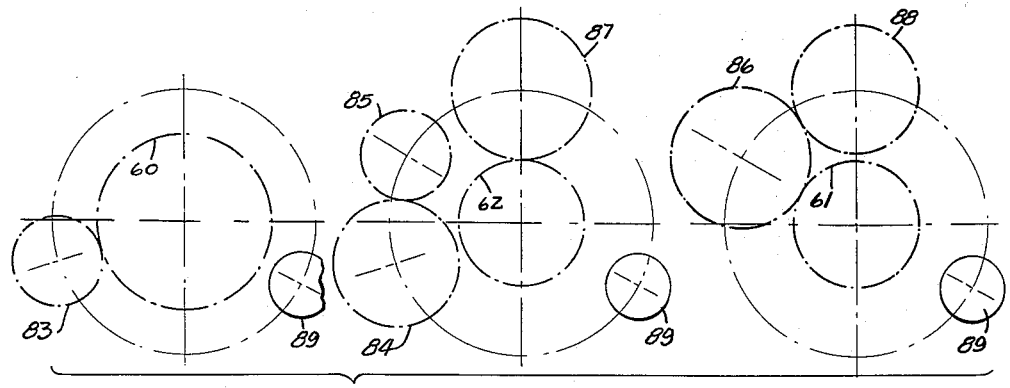
Figure 6:
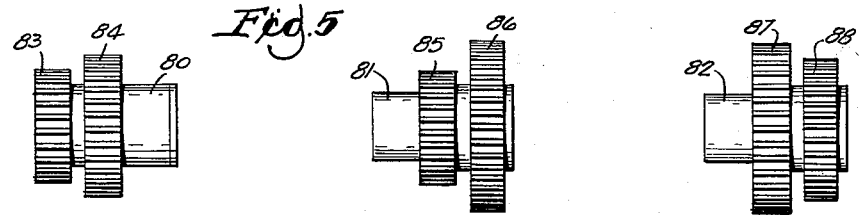
Figure 7:
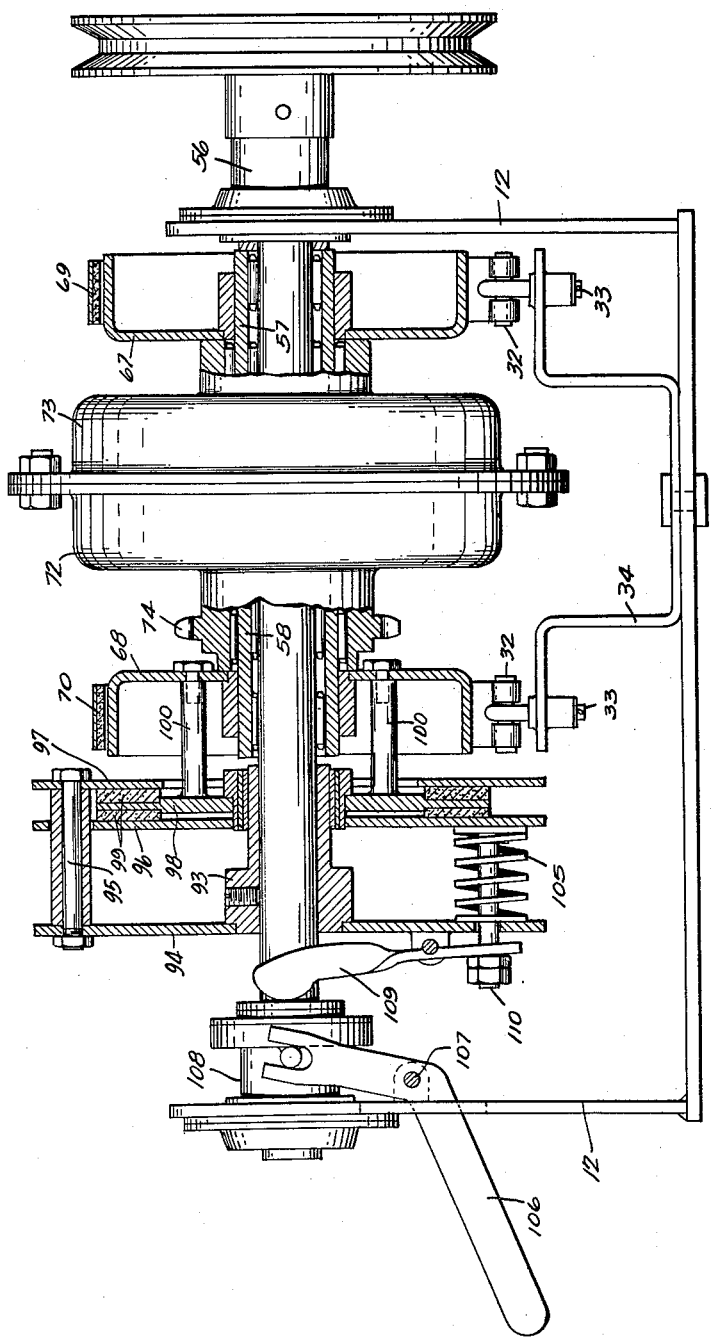

In the drawings:

FIG. 1 is a sectional view axially of the main shaft of the transmission,

FIG. 2 is an end elevation of the structure shown in FIG. 1 with portions broken away to show a part of a control mechanism, FIG. 3 is a sectional view on line 3—3 and looking down on a portion of the control mechanism, FIG. 4 is a longitudinal sectional view of a second embodiment of the present invention which involves a number of planet assemblies and presents a number of advantages over the first embodiment, FIG. 5 is a diagram showing how the gears of various planet assemblies coact with a reaction gear, a sun gear or a gear on another planet assembly, FIG. 6 is an elevational view of the three planet assemblies used in the second embodiment and showing the relative size and position of the gears forming such assemblies, and FIG. 7 is a view partially in elevation and partially in longitudinal section, of a transmission according to FIGS. 4-6 but with a clutch sharing with a drum-band structure in control of one reaction gear, and producing three speeds of output power.

Referring specifically to the drawings, numeral 10 designates a main shaft supported on bearings 11 mounted in a portion 12 of a vehicle frame. The bearings 11 are preferably ball-bearings and their inner race ways 13 are held on the shaft 10 by collars 14 so that the shaft and the parts supported thereby are firmly positioned axially of the main shaft and relative to the frame. Between the bearings 11, 13 are placed sleeves 18 and 19 mounted on the shaft 10 by rollers 20 and bearing at one end on thus washers 21 seated against the bearing races 13. At the other end the sleeves 18, 19 bear on thrust washers 22 seating on a gear 23 fixed on the shaft.

A drum 28 is keyed on the sleeve 18 and a drum 29 is keyed on the sleeve 19 and bands 30, 31 are placed around the respective drums with an end of each band fixed on the frame 12. The other ends of the bands 30, 31 are each connected with a pin 32 rotatable in a pivot 33 mounted in the end of a substantially U-shaped yoke 34 pivoted on the frame 12. The yoke can be swung about its pivot to tighten either one of the bands about its drum upon respectively pulling on or pushing against a rod 35 attached to the yoke, or to assure release of both the bands.

The sleeves 18 and 19 carry several sets of rollers 39 on which is rotatably mounted a housing 40, 41 made with diverging flanges forming a V-groove for receiving a V-belt from an internal combustion engine or other source of power. The housing 40, 41 carries a shaft 42 in the nature of an axle which supports rollers 43 in turn supporting a sleeve 44 on which are fixed gears 45, 46 and 47. Gears 45 and 47 respectively mesh with gears 50 and 51 severally fixed on sleeves 18 and 19 and gear 46 meshes with gear 23 on shaft 10. Gears 45, 46 and 47 are carried around the gear 23 by the housing, in the manner of planets moving around a sun and are spun by engagement of gear 45 or 47 with gear 50 or 51, each serving as a reaction member when it is held stationary. In the present embodiment of the invention there is only one planet assembly and the weight thereof is counter-balanced by a weight 52 fixed in the housing 44 diametrically across the housing from the planet.

Assuming that the input speed by way of the housing 40, 41 is 1000 r.p.m. and that the gears have the following number of teeth:

| Gear | 23 | 45 | 46 | 47 | 50 | 51 |
|---|---|---|---|---|---|---|
| Teeth | 20 | 14 | 16 | 18 | 22 | 18 | and that a reverse drive is desired, the rod 35 is pushed to swing the yoke 34 counter-clockwise which tightens the band 30 on the drum 28. The drum 28 then holds or fixes gear 50 so that planet 45 is rotated about the then fixed on reaction gear 50 as the planet carrier-housing 40, 41 is rotated by a belt from a source of power. The gear 46 is then driven and meshes with sun gear 23 so that power flows to output shaft 10 while gears 47 and 51 may rotate freely. Inasmuch as input planet 45 has a smaller number of teeth than output planet 46, the sun gear 23 is driven in the opposite direction from that of the carrier-housing movement and rotation of the shaft 10 is in reverse direction. The effective pairs of gears involved are 45 and 50 and 46 and 23 and the tooth ratios of such gears are respectively 14/22 and 16/20. Hence the reverse output speed is 3.8 to 1.0 or 260 r.p.m.

When the rod 35 is pulled, it swings yoke 34 in clockwise direction to tighten the band 31 (and release the band 30). Sleeve 19 is now held and fixes the position of gear 51. Planet gear 47 then rotates about reaction gear 51 as the carrier-housing is driven by the belt and the gear 46 again transmits power to the sun gear 23. The planet gear 47 is now the input gear and is larger than the gear 46 and the sun gear 23 is larger than the reaction gear 51 so that the net result is driving of the shaft 10 in forward direction. Due to the ratios of the gears 47, 51 and 46, 23 involved in the present flow of power, the ratio of speed output to speed input is 5.0 to 1.0 or 200 r.p.m. Obviously the drum-bands 28, 30 and 29, 31 may be replaced by braking means which may be selectively operated.

If two speeds forward are required from the above structure, the gears are made as follows:

Gear    23  45  46  47  50  51
Teeth   24  15  12  18  21  18

At 1000 r.p.m. input, the above numbers of teeth produce a low forward speed of 3.3 to 1.0 or 300 r.p.m. and a high forward speed of 2.0 to 1.0 or 500 r.p.m. using the same pairs of gears as above described. By changing the sizes of the various input and output gear trains or pairs of gears, many different forward speeds are available ranging in ratio lower than 10.0 to 1.0 and higher than 1.2 to 1. Obviously even higher ratios are obtainable by suitable choice of the number of teeth, but for the present purposes, the speed changes are limited to those above mentioned.

Referring to FIG. 4, the frame 12 again carries the outer race ways of ball bearings 11 and the inner race ways thereof are held on shaft 56 which is now the input shaft. Sleeves 57 and 58 are mounted on needle bearings 59 running on the shaft and the sleeves have respectively fixed thereon gears 60 and 61 which serve as reaction members when held stationary. The shaft 56 has fixed thereon gear 62 in a substantially central position so that the spacers 63, 64 between the gears 62 and the sleeves 57, 58, and sleeves adjacent the shaft bearings position the sleeves and their gears on the shaft. Sleeves 57 and 58 respectively have fixed thereon a drum 67 and a drum 68 for coaction with the bands 69 and 70 by which the drums may be respectively held stationary, when the bands are actuated by a yoke-rod structure described above, or the like.

Roller bearings 71 are mounted on sleeves 57, 58 and support a housing of two portions 72, 73 which incloses the gearing. A sprocket 74 is mounted on the housing 72, 73 for output of power as will be described. A plurality of sets of planet gears (see FIG. 6) are rotatably mounted in the housing on axles 75 with roller bearings 76 supporting hubs 80, 81 and 82 of the planet assemblies. Each hub gears two gears numbered 83 to 88 and the several sets of gears mesh as indicated in FIG. 5. The pinion gears mesh with other pinion gears or the reaction gears or the sun gear and the various gears have teeth as follows:

Gear    60  61  62  83  84  85  86  87  88
Teeth   24  16  16  12  16  12  20  20  16

By reference to FIG. 5 it will be seen that the above three hubs are not equally spaced around the axis of shaft 56 so that a counter balance 89 is placed in the housing to reduce unbalanced forces upon rotation of the housing. The planet sets are so placed that pinion 83 of hub 80 meshes with reaction gear 60 while pinion 84 meshes with pinion 85 of hub 81. Pinion 86 of hub 81 meshes with the reaction gear 61 and with pinion 88 of hub 82. Pinion 87 of hub 82 meshes with the sun gear 62. With gears of the size above indicated and arranged as shown in FIG. 5, the present embodiment has one reverse and one forward speed respectively when the band 69 is drawn up on drum 67 and when the band 70 is drawn up on drum 68. When both bands are loose the transmission is in neutral position.

The present construction thus provides one forward speed and one reverse speed at different transmission ratios. For the forward speed, band 70 is tightened to hold drum 68, sleeve 58 and gear 61 stationary. The power input path then includes shaft 56, sun gear 62, pinion gear 87 and pinion gear 88 and pinion gear 86 which reacts on reaction gear 61 and causes rotation of housing 72, 73 and the driven sprocket 74.

For reverse power flow, band 69 is tightened to drum 67 and sleeve 57 and gear 60 are held stationary. The power flow path now includes shaft 56, sun gear 62, pinion 87, 88, pinions 86, 85, pinion 84 and pinion 83 which meshes with reaction gear 60. Gear 60 is now being held stationary and the planets sets must rotate about such gear and rotate carrier-housing and output sprocket. It will thus be seen that gear 62 always rotates and acts as a sun gear but gears 60 and 61 are respectively held against rotation at different times and thus serve as reaction gears.

Assuming that the gears have numbers of teeth as above described and that the input speed is 1000 r.p.m., the pairs of gears involved in the forward speed are 62, 87 and 88, 86 and 86, 61 and the teeth ratios are 16/20, 16/20 and 20/16 so that the input speed is reduced to 445 r.p.m. which is a ratio of 2.25 to 1. For reverse speed, the pairs of gears involved are 62, 87 and 88, 86 and 85, 84 and 83, 60 with tooth ratios of 16/20, 16/20, 12/16 and 12/24 so that the input speed of 1000 r.p.m. is reduced to 315 r.p.m. or a ratio of 3.16 to 1. It will be noted that the forward speed involves only three pairs of gears while the reverse speed involves four pairs of gears, the extra pair of gears being unusual in a true planetary transmission. Because of the use of three sets of pinions in FIGS. 4–6 as opposed to only two sets of pinions in FIGS. 1–3, the present transmission allows for wider range of speeds and more desirable flow of power than in the first construction.

The structure shown in FIG. 7 involves the addition of a clutch to the structure previously described in connection with FIGS. 4–6, whereby gear 61 in such figures may be held against rotation by the drum-band 68, 70 or may be rotated at the speed of the input shaft 56 by operation of a plate clutch (the gear 61 being part of the train of gearing for forward movement). Sleeve 93 is fixed on the shaft 56 and has a flange 94 from which extend bars 95 for axial movement of a plate 96 thereon and for mounting of a fixed plate 97 in spaced relation to plate 96. A rotatable clutch plate 98 with friction disk facings 99 is mounted between the plates 96 and 97 and is connected as by rods 100 with the drum 68. The axially movable plate 96 is pressed against the rotatable plate 98 by springs 105 acting between such plate 96 and the sleeve flange 94. When the springs are effective to press the plates 96 and 98 on the plate 97, the shaft 56 drives the sleeve 58 and the gear 61 thereon as above described. The springs 105 may be compressed by lifting lever 106 about its pivot point 107 to press its forked end on a sleeve 108 for movement thereof toward the right (in FIG. 7). The right hand end of the sleeve 108 bears on a lever 109 acting on rods 110 attached to the clutch plate 96 so that the plate 96 may be drawn away from the rotatable clutch plate 98. When the plate 96 does not bear on the rotatable plate 98, and when the drum-band 68, 70 is not acting, no power is transmitted to the sleeve 58 and the sleeve and the gear thereon are free to rotate.

When the band 70 grips drum 68, the action is as above described and a low forward speed of 445 r.p.m. is obtained. At such times the sleeve 58 is held stationary and the gear 61 thereon acts as a reaction gear for the pinion 86 on the hub 81.

However, whenever the plate clutch 96—99 is engaged (and the band 70 does not grip the drum 68), the clutch drives the drum 68, the sleeve 58 and the gear 61 at the speed of the input shaft 56. Gear 61 engages pinion 86 of hub 81 and drives pinion 88 of hub 82. Pinion 87 of hub 82 tends to drive sun gear 62 but gear 62 is fixed to input shaft 56 as is true of the clutch and these parts rotate as a unit. Therefore we now have a high forward speed of 1000 r.p.m.

In each of the above constructions, the housing is rotatable on sleeves which are themselves rotatable on the main shaft. The sleeves each carry a gear which may act as a reaction gear while the main shaft carries a sun gear about which one or more planet gears rotate. The sleeves are severally held stationary when a reaction gear is to be effective. The planetary action then rotates the housing relative to the shaft. Power is put into and taken out of the transmission either by way of the main shaft or the housing dependent on the number and arrangement of the planet pinions. Whether or not rotation is in forward or reverse direction depends on the ratios and the number of the pairs of gears involved, as is also true of the speed change obtained.

It will be seen that the present construction involves placing only the gearing in oil in the housing-carrier so that the housing size is restricted to only the space required for the gearing and the counter weight. The brakes are not inclosed and are therefore readily accessible for adjustment, replacement of bands and maintenance generally. Complete exposure of the brakes of course provides the maximum of cooling if the brakes should be "slipped" as mentioned below. Any size and kind of brake may be used without affecting the size of the housing. Use of large brakes provides the advantage that the band may be allowed to slip so that power flow to the gearing is free from shock. Even relatively rapid change from forward to reverse is obtainable without creation of significant stresses. Further, less effort is required to hold a sleeve and orbit gear with a large brake than when brakes are restricted in size.

I claim:
1. A planetary speed changing transmission comprising a rotatable input shaft, plural sleeves rotatable on the shaft, a first gear fixed on the shaft, second gears severally fixed on each of said sleeves, a housing enclosing the gears and rotatable on the sleeves, means on the housing for output of power therefrom, plural pinion assemblies rotatable in the housing for planetary movement relative to the first gear, one gear of each of two of the pinion assemblies meshing respectively with one of the second gears and one gear of one of the pinion assemblies meshing with the first gear, a gear of each of the pinion assemblies meshing with a gear of another of the assemblies, means for selectively holding a sleeve and the second gear thereon stationary for causing rotation of the power output means in a direction and at a speed dependent upon which of the second gears is being held stationary.

2. The transmission of claim 1 which provides three pairs of gears in train upon holding of a sleeve for rotation of the power output means in one direction and which provides four pairs of gears in train upon holding of a sleeve for rotation of the power output means in the other direction.

3. The transmission of claim 2 in which the pinion assemblies each include a pair of gears of different sizes and each have one gear meshing with one of the second gears, the power output means operating at lower speed when the four pairs of gears are in train.

4. The transmission of claim 2 including a clutch whereby one of the second gears may be connected with the shaft to add another and higher speed to the rotation of the output means in one direction when the three pairs of gears are in use.

References Cited in the file of this patent
UNITED STATES PATENTS

| | | |
|---|---|---|
| 1,045,213 | Swedlund | Nov. 26, 1912 |
| 1,652,432 | Fisher | Dec. 13, 1927 |
| 2,794,350 | Hart | June 4, 1957 |
| 3,002,402 | Howe | Oct. 3, 1961 |